United States Patent
Huang et al.

(10) Patent No.: US 8,234,661 B1
(45) Date of Patent: *Jul. 31, 2012

(54) SECURE DIGITAL INPUT/OUTPUT INTERFACE SYSTEM

(75) Inventors: Frank Huang, Pleasanton, CA (US); James Jan, San Jose, CA (US); Robert Lee, Fremont, CA (US); Bing Zhao, Fremont, CA (US); Yao Chen, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,946

(22) Filed: Feb. 27, 2012

Related U.S. Application Data

(63) Continuation of application No. 11/983,708, filed on Nov. 9, 2007, now Pat. No. 8,127,309.

(60) Provisional application No. 60/865,327, filed on Nov. 10, 2006.

(51) Int. Cl.
*G06F 3/00* (2006.01)
*G06F 5/00* (2006.01)

(52) U.S. Cl. ......................... 719/321; 710/43

(58) Field of Classification Search ................. 719/321; 710/260

See application file for complete search history.

(56) References Cited

U.S. PATENT DOCUMENTS

| | | | |
|---|---|---|---|
| 5,136,528 A | 8/1992 | Fordham et al. | |
| 5,418,935 A | 5/1995 | Whittaker et al. | |
| 6,173,349 B1 | 1/2001 | Qureshi et al. | |
| 6,297,794 B1 | 10/2001 | Tsubouchi et al. | |
| 7,269,669 B2 | 9/2007 | Liu et al. | |
| 7,568,211 B2 | 7/2009 | Mai et al. | |
| 7,587,544 B2 * | 9/2009 | Tang et al. | 710/260 |
| 2003/0028697 A1 | 2/2003 | Nguyen | |
| 2003/0145145 A1 | 7/2003 | Muroor | |
| 2004/0225796 A1 | 11/2004 | Hanson et al. | |
| 2005/0144385 A1 * | 6/2005 | Mowery et al. | 711/115 |
| 2008/0077722 A1 * | 3/2008 | Tang et al. | 710/260 |

OTHER PUBLICATIONS

Ramesh, Concurrent Error Detection Schemes for Fault-Based Side-Channel Cryptanalysis of Symmetric Block Ciphers, Dec. 2002.*
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages.

(Continued)

*Primary Examiner* — Lechi Truong

(57) ABSTRACT

An interface system includes a first driver module that communicates through a bus with a first peripheral card when the bus is in a first mode. A second driver module communicates through the bus with a second peripheral card when the bus is in a second mode. A bus control module receives a communication notification signal from the second peripheral card when the first peripheral card is communicating with the first driver module. The communication notification signal does not interfere with the communication of the first peripheral card and the first driver module. The bus control module switches the bus between first and second modes in response to the communication notification signal.

18 Claims, 11 Drawing Sheets

OTHER PUBLICATIONS

IEEE Std 802.11b-1999/Cor 1-2001 (Corrigendum to IEEE Std 802.11b-1999); IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 2: Higher-speed Physical Layer (PHY) extension in the 2.4 GHz band—Corrigendum 1; IEEE Computer Society; Sponsored by the LAN/MAN Standards Committee; Nov. 7, 2001; 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.11-04/0889r6; IEEE P802.11 Wireless LANs; TGn Sync Proposal Technical Specification; May 18, 2005; 131 pages.

IEEE Std 802.16-2001™; IEEE Standard for Local and metropolitan area networks; Part 16: Air Interface for Fixed Broadband Wireless Access Systems; IEEE Computer Society and the IEEE Microwave Theory and Techniques Society; Sponsored by the LAN/MAN Standards Committee; Apr. 8, 2002; 349 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE 802.11a/g/b; WLAN Subsystems; Host Driver, Firmware, and Interface; Firmware Specification v8.0; Doc No. MV-S103753-00, Rev.—May 22, 2006; 152 pages.

Power Management Architecture Specification; Revision 1.11; Marvell Semiconductor Inc.; Jan. 4, 2006; 31 pages.

IEEE 802.20-PD-06; IEEE P 802.20™V14; Jul. 16, 2004; Draft 802.20 Permanent Document; System Requirements for IEEE 802.20 Mobile Broadband Wireless Access Systems—Version 14; 24 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

* cited by examiner

SECURE DIGITAL INPUT/OUTPUT INTERFACE SYSTEM

CROSS-REFERENCE TO RELATED APPLICATIONS

This application is a continuation of U.S. application Ser. No. 11/983,706, filed Nov. 9, 2007, which claims the benefit of U.S. Provisional Application No. 60/865,327, filed on Nov. 10, 2006. The disclosure of the above application is incorporated herein by reference in its entirety.

FIELD

The present disclosure relates to data communications and more particularly to secure digital (SD) and SD input/output (SDIO) data communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Mobile devices such as laptop computers, personal digital assistants (PDAs), digital video devices, cellular phones, digital cameras, and portable audio devices may be referred to collectively as "host devices". Host devices may be equipped with interface modules to accommodate integrated circuit (IC) cards. The interface modules are commonly designated as Secure Digital (SD) interface modules, and the cards as SD cards.

Two international standards for SD cards include the SD memory standard for memory devices and the SD input/output (SDIO) standard for input/output devices. The SDIO standard is an extension of the SD memory card standard and covers both input/output functions and memory functions. SD cards may be peripherals compliant with the SD standard. SDIO cards may be peripherals compliant with the SDIO standard. SD memory cards may include flash memory or any other type of non-volatile memory.

SDIO may expand functionality of a host device and may include serial, modem, camera, global positioning system (GPS), or wireless local area network (WLAN) cards. In contrast, SD is generally only used for storage expansion. A host device with a SDIO interface module may accept both SDIO and SD memory cards, but a host device with only a SD interface may not necessarily accept SDIO cards. A host device may be specifically required to be "SDIO-capable" in order to be compatible with SDIO cards.

Referring now to FIG. 1, a SDIO WLAN card 10 may provide a host device 12 with a wireless connection to a WLAN network. The SDIO card 10 may include a radio frequency (RF) module 14 and RF antenna 16. The RF module 14 may be compatible with any of IEEE standards 802.11, 802.11a, 802.11b, 802.11g, 802.11h, 802.11n, 802.16, 802.20 and Bluetooth.

The SDIO WLAN card 10 may include an SDIO control module 20 that allows peripherals, which may be added to or may communicate with the SDIO WLAN card 10, to comply with the SDIO standard. The SDIO control module 20 may also control SD and SDIO applications within the host device 12. The host device 12 may include an interface module 22 having a bus 23. The bus 23 may include a control module 24 that communicates with the SDIO card 10 via a port 26. The control module 24 may communicate with WLAN application modules 30 within the host 12 via a driver module 31. The SDIO WLAN card 10 may include a buffer 34 and/or memory 36 to store data and/or processes that may be used to implement SDIO functions.

SUMMARY

An interface system includes a first driver module that communicates through a bus with a first peripheral card when the bus is in a first mode. A second driver module communicates through the bus with a second peripheral card when the bus is in a second mode. A bus control module receives a communication notification signal from the second peripheral card when the first peripheral card is communicating with the first driver module. The communication notification signal does not interfere with the communication of the first peripheral card and the first driver module. The bus control module switches the bus between first and second modes in response to the communication notification signal.

In other features, the first mode includes a secure digital (SD) mode, and the second mode includes a SD input/output (SDIO) mode. The first peripheral card and the second peripheral card generate the communication notification signal. The first peripheral card includes a SD memory card, and the second peripheral includes a SDIO card. The SDIO card includes a radio frequency (RF) module and an antenna that communicates with the RF module. The RF module is compliant with at least one of IEEE standards 802.11, 802.11a, 802.11b, 802.11g, 802.11h, 802.11n, 802.16, 802.20 and Bluetooth.

In other features, the first and second driver modules request access to the bus for the communications with the first and second peripheral cards. The bus control module switches between the first and second modes based on control of a semaphore. The first and second driver modules acquire the semaphore based on a respective access request. The control module switches to the first mode from the second mode after a predetermined amount of time based on first driver module signals that are generated prior to the switching. The second peripheral card includes an interrupt module that generates the communication notification signal and an interrupt that interrupts bus communications. The communication notification signal indicates the interrupt is pending.

In other features, the interface system includes a host device that includes the bus. The host device includes at least one of a generic purpose input and a generic purpose output. The interrupt module transmits the communication notification signal through at least one of the generic purpose input and the generic purpose output. The interrupt module holds the interrupt until the bus control module switches from the first mode to the second mode. The bus further includes a multiplexer. The first and second peripheral card communications are conducted through the multiplexer. The bus control module controls the multiplexer.

In other features, a peripheral card communicates through a bus that includes a bus control module. The peripheral card includes a control module that communicates through the bus in a first data transmission mode. An interrupt module transmits an interrupt to the bus control module when communications through the bus are in a second data transmission mode that is different than the first transmission mode. The interrupt module transmits a notification signal without disrupting the second data transmission mode communications to the bus control module. The notification signal indicates that the interrupt is pending. The interrupt module holds the transmission of the interrupt until the bus control module switches to the first data transmission mode.

In other features, the first data transmission mode includes a SD input/output (SDIO) mode and the second data transmission mode includes secure digital (SD) mode. The peripheral card further includes a radio frequency (RF) module and an antenna that communicates with the RF module. The RF module is compliant with at least one of IEEE standards 802.11, 802.11a, 802.11b, 802.11g, 802.11h, 802.11n, 802.16, 802.20 and Bluetooth. An interface system includes the peripheral card. The peripheral card includes a SDIO card. The interface system further includes the bus and a first driver module that communicates through the bus with the peripheral card in the first data transmission mode. The interface system further includes a second peripheral card and a second driver module that communicate through the bus in the second data transmission mode.

In other features, the bus control module switches the bus between the first and second data transmission modes in response to the notification signal. The first driver module requests access to the bus for the communications with the first peripheral card. The bus control module switches between the first and second data transmission modes based on control of a semaphore. The first driver module acquires the semaphore based on the access request. The bus control module switches to the second data transmission mode from the first data transmission mode after a predetermined amount of time.

In other features, the interface system further includes a host device that includes the bus. The host device includes at least one of a generic purpose input and a generic purpose output. The interrupt module transmits the notification signal through at least one of the generic purpose input and the generic purpose output. The bus further includes a multiplexer. Communications through the bus are conducted through the multiplexer. The bus control module controls the multiplexer.

In other features, a method for operating an interface system includes communicating through a bus with a first peripheral card when the bus is in a first mode. The method also includes communicating through the bus with a second peripheral card when the bus is in a second mode. The method also includes receiving a communication notification signal from the second peripheral card when the first peripheral card is communicating through the bus. The communication notification signal does not interfere with the communication of the first peripheral card through the bus. The method also includes switching the bus between first and second modes in response to the communication notification signal.

In other features, the first mode includes a secure digital (SD) mode and the second mode includes a SD input/output (SDIO) mode. The method also includes generating the communication notification signal from the first peripheral card and the second peripheral card. The first peripheral card includes a SD memory card and the second peripheral includes a SDIO card. The method also includes requesting access to the bus for the communications with the first and second peripheral cards. The method also includes switching between the first and second modes based on control of a semaphore.

In other features, the method further includes switching to the first mode from the second mode after a predetermined amount of time based signals that are generated prior to the switching. The method also includes generating the communication notification signal and an interrupt that interrupts bus communications. The communication notification signal indicates the interrupt is pending. The method also includes holding the interrupt until the bus switches from the first mode to the second mode.

In other features, a method for operating a peripheral card includes communicating through a bus in a first data transmission mode. The method also includes transmitting an interrupt when communications through the bus are in a second data transmission mode that is different than the first transmission mode. The method also includes transmitting a notification signal without disrupting the second data transmission mode communications that indicates that the interrupt is pending. The method also includes holding the transmission of the interrupt until the bus switches to the first data transmission mode.

In other features, the first data transmission mode includes a SD input/output (SDIO) mode and the second data transmission mode includes secure digital (SD) mode. The method also includes switching the bus between the first and second data transmission modes in response to a notification signal. The method also includes requesting access to the bus for the communications in the first data transmission mode. The method also includes switching between the first and second data transmission modes based on control of a semaphore. The method also includes switching to the second data transmission mode from the first data transmission mode after a predetermined amount of time.

An interface system includes first driver means for communicating through a bus with first peripheral means for communicating when the bus is in a first mode. The system also includes second driver means for communicating through the bus with second peripheral means for communicating when the bus is in a second mode. The system also includes bus control means for receiving a communication notification signal from the second peripheral means when the first peripheral means is communicating with the first driver means. The communication notification signal does not interfere with the communication of the first peripheral means and the first driver means. The bus control means switches the bus between first and second modes in response to the communication notification signal.

In other features, the first mode includes a secure digital (SD) mode, and the second mode includes a SD input/output (SDIO) mode. The first peripheral means and the second peripheral means generate the communication notification signal. The first peripheral means includes a SD memory card, and the second peripheral includes a SDIO card. The SDIO card includes radio frequency (RF) means for communicating with antenna means for transmitting signals. The RE means is compliant with at least one of IEEE standards 802.11, 802.11a, 802.11b, 802.11g, 802.11h, 802.11n, 802.16, 802.20 and Bluetooth.

In other features, the first and second driver means request access to the bus for the communications with the first and second peripheral means. The bus control means switches between the first and second modes based on control of a semaphore. The first and second driver means acquire the semaphore based on a respective access request. The control means switches to the first mode from the second mode after a predetermined amount of time based on first driver means signals that are generated prior to the switching. The second peripheral means includes an interrupt means for generating the communication notification signal and for generating an interrupt that interrupts bus communications. The communication notification signal indicates the interrupt is pending.

In other features, the interface system includes a host device that includes the bus. The host device includes at least one of a generic purpose input and a generic purpose output.

The interrupt means transmits the communication notification signal through at least one of the generic purpose input and the generic purpose output. The interrupt means holds the interrupt until the bus control means switches from the first mode to the second mode. The bus further includes multiplexing means for selecting. The first and second peripheral means communications are conducted through the multiplexing means. The bus control means controls the multiplexing means.

In other features, peripheral means for communicating through a bus includes bus control means for controlling the bus. The peripheral means includes control means for communicating through the bus in a first data transmission mode. The system also includes interrupt means for transmitting an interrupt to the bus control means when communications through the bus are in a second data transmission mode that is different than the first transmission mode. The interrupt means transmits a notification signal without disrupting the second data transmission mode communications to the bus control means. The notification signal indicates that the interrupt is pending. The interrupt means holds the transmission of the interrupt until the bus control means switches to the first data transmission mode.

In other features, the first data transmission mode includes a SD input/output (SDIO) mode and the second data transmission mode includes secure digital (SD) mode. The peripheral means further includes radio frequency (RF) means for communicating with antenna means for transmitting signals. The RF means is compliant with at least one of IEEE standards 802.11, 802.11a, 802.11b, 802.11g, 802.11h, 802.11n, 802.16, 802.20 and Bluetooth. An interface system includes the peripheral means. The peripheral means includes a SDIO card. The interface system further includes the bus and first driver means for communicating through the bus with the peripheral means in the first data transmission mode. The interface system further includes second peripheral means for communicating through the bus in the second data transmission mode with second driver means for driving a device.

In other features, the bus control means switches the bus between the first and second data transmission modes in response to the notification signal. The first driver means requests access to the bus for the communications with the first peripheral means. The bus control means switches between the first and second data transmission modes based on control of a semaphore. The first driver means acquires the semaphore based on the access request. The bus control means switches to the second data transmission mode from the first data transmission mode after a predetermined amount of time.

In other features, the interface system further includes a host device that includes the bus. The host device includes at least one of a generic purpose input and a generic purpose output. The interrupt means transmits the notification signal through the at least one of the generic purpose input and the generic purpose output. The bus further includes multiplexing means for conducting communications through the bus. The bus control means controls the multiplexer.

Further areas of applicability of the present disclosure will become apparent from the detailed description provided hereinafter. It should be understood that the detailed description and specific examples, while indicating embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
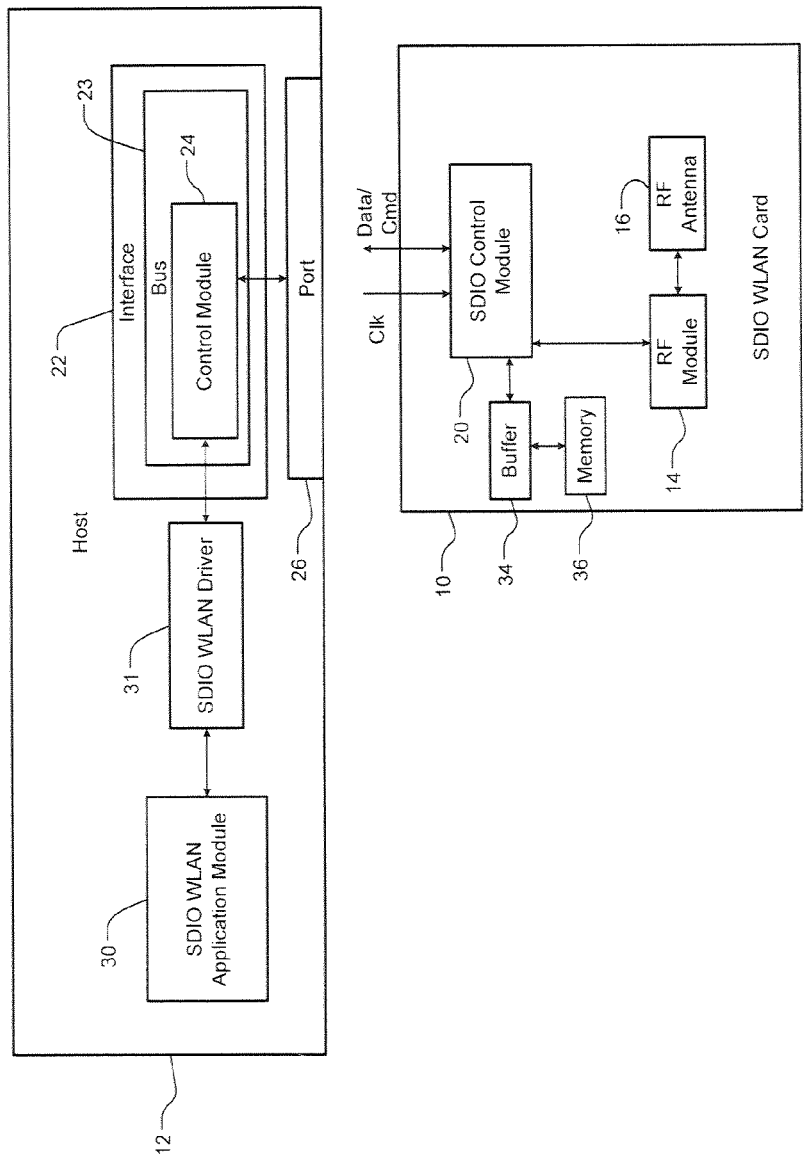
FIG. 1 is a functional block diagram of an interface system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A host device may include a mobile device, such as a laptop computer, personal digital assistant (PDA), digital video device, cellular phone, or digital camera. A host device may also include any system capable of interfacing and otherwise communicating with peripheral cards, such as a hard disk drive (HDD), digital-versatile-disk (DVD), vehicle system, high definition television (HDTV), and the like.

The present disclosure includes a host side bus that controls mutual access of peripherals to host side secure digital (SD) and SD input/output (SDIO) driver modules. The bus may include a multiplexer (MUX) that is controlled by a bus control module and that controls respective accesses in SD and SDIO modes. In the SD mode, the bus allows SD communications through the MUX, and in the SDIO mode, the bus allows SDIO communications through the MUX.

The peripherals may include a SD card and a SDIO card, which may be a wireless local area network (WLAN), serial, modem, camera, global positioning system (GPS) card. An exemplary SDIO WLAN card may generate interrupts and notifications/wakeup signals of the interrupts when the bus is in the SD mode and not the SDIO mode to gain access to the SDIO driver module. The notifications might not be communicated through the MUX but may instead be received in the bus control module. The SDIO WLAN card may hold the interrupts until the bus control module switches from the SD mode to the SDIO mode in response to the notifications.

Figure 2:
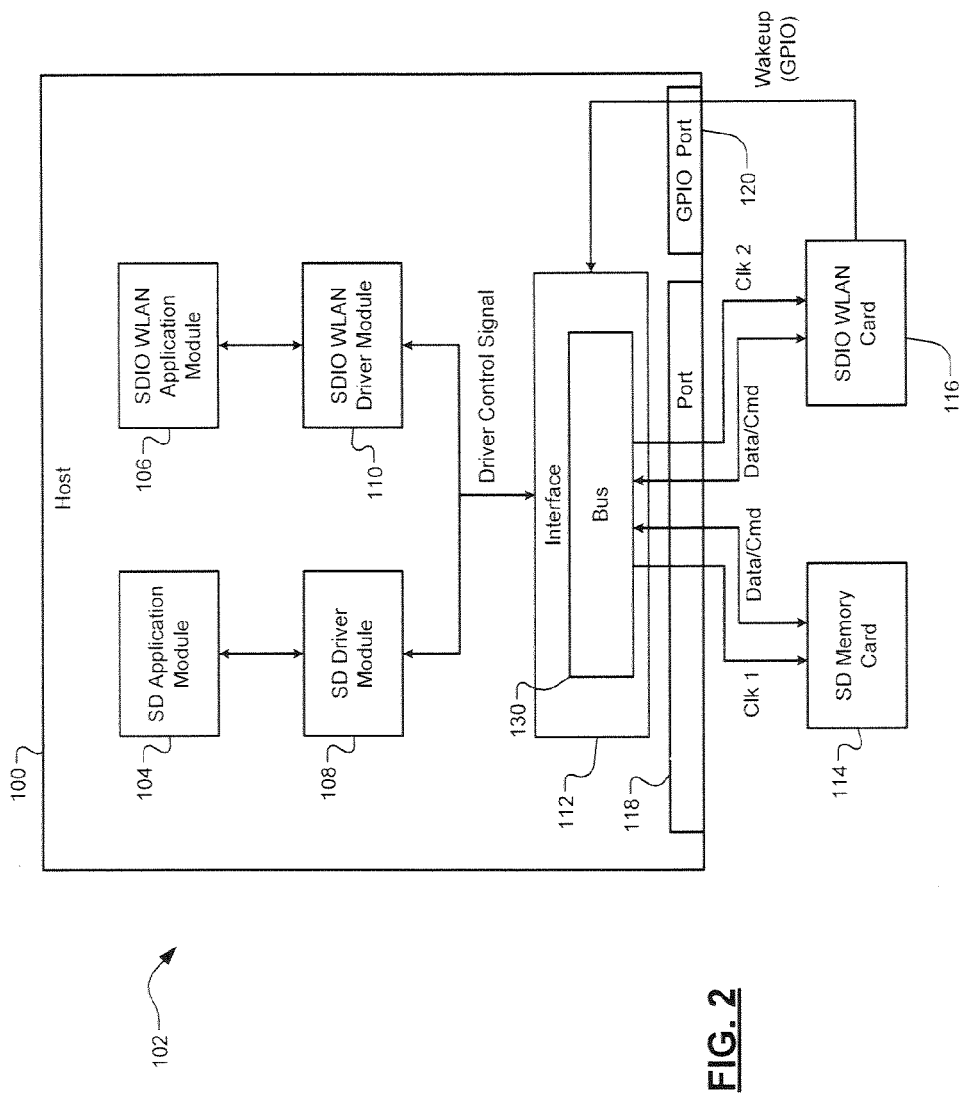
FIG. 2 is a functional block diagram of an interface system according to the present disclosure.

Referring now to FIG. 2, a host device 100 of an exemplary interface system 102 may include or communicate with SD and SDIO application modules 104, 106. The host device 100 may therefore be both SD and SDIO compliant. The SDIO application module 106 is illustrated as an exemplary SDIO WLAN application module. SD and SDIO WLAN driver modules 108, 110 allow interactions with the SD and SDIO WLAN application modules 104, 106 respectively based on driver module control signals from an interface module 112. In other words, the SD and SDIO WLAN driver modules 108, 110 may direct communications between peripheral SD memory/SDIO cards 114, 116 and respective SD/SDIO WLAN application modules 104, 106.

For example, when one of the SD and SDIO application modules 104, 106 invokes a routine in one of the SD and SDIO driver modules 108, 110, the driver module issues commands to the respective card. When the respective card sends data, the driver module invokes routines in the respective application module.

The interface module 112 communicates with SD memory and SDIO WLAN cards 114, 116 via one or more ports/slots 118, 120. The ports 118, 120 may include a SD compatible port/input 118 and a generic purpose I/O (GPIO) port/input 120. Such communications may include data, command, and clock signals sent to and/or received from the SD memory/SDIO WLAN cards 114, 116, and interrupts from either of the SD memory/SDIO WLAN cards 114, 116. Generally, however, the SDIO WLAN card 116 will transmit interrupts as it may be a more active device as opposed to the SD memory card 114 that may be a more passive device that merely responds to reads/writes.

The SDIO WLAN card 116 may also generate and/or transmit a notification/wakeup signal that notifies the bus 130 of the interrupts via the GPIO port 120. The GPIO port 120 may be a generic purpose port whereby other external modules (for example, a radio transceiver) may connect to the host device 100 without communicating through the SD/SDIO port 118 and/or the MUX 150.

The interface module 112 includes a SD/SDIO compatible host side bus 130 that arbitrates respective SD/SDIO WLAN card access to the SD/SDIO WLAN driver modules 108, 110. Generally, the interface module 112 decodes commands to and from the host device 100 according to one of the SD and SDIO standards at a time.

For example, the interface module 112 receives a command signal sent by the SDIO WLAN application module 106, decodes the command signal, and subsequently generates a response command signal. The interface module 112 then sends the response command signal back to the SDIO WLAN application module 106. The interface module 112 may also check the data sent via the bus 130 for error, store checked data in temporary memory (not shown), and read pooled data out of the temporary memory. The interface module 112 may send the pooled data with an error check code to the SDIO WLAN application module 106 via the bus 130. The functional and timing specifications of the bus 130 may be based on one or both of the SD and SDIO standards.

Figure 3:
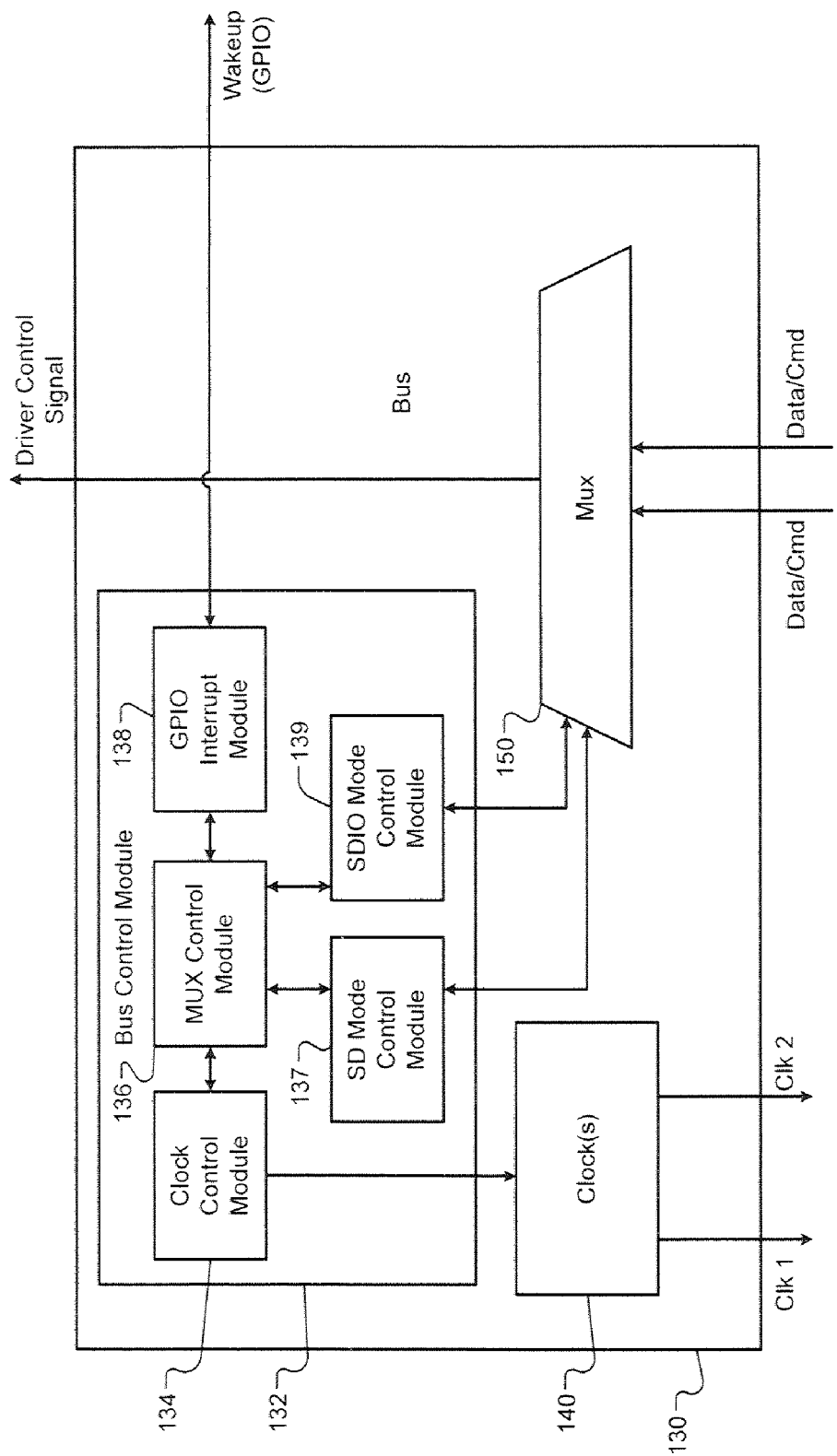
FIG. 3 is a functional block diagram of a bus according to the present disclosure.

Referring now to FIG. 3, a control module 132 of the bus 130 may include a clock control module 134, a MUX control module 136, and a GPIO interrupt module 138. The clock control module 134 controls one or more clocks 140 that generate one or more clock signals that may be used to control access to the driver modules 108, 110. The GPIO interrupt module 138 may receive and process notification signals that indicate interrupt signals from the SDIO WLAN card 116.

The MUX control module 136 may control a MUX 150 so that data and/or command signals from one of the SD memory and SDIO WLAN cards 114, 116 may control a respective driver module at any given time. The MUX control module 136 controls the MUX 150 so that a SD device, such as the SD memory card 114 and a SDIO device, such as a SDIO WLAN card 116, may use the same interface module 112.

The MUX control module 136 may control the MUX 150 via controlling a SD mode control module 137 and a SDIO mode control module 139. The MUX control module 136 may activate one of the SD and SDIO mode modules 137, 139 at a time. The SD mode control module 137 and the SDIO mode control module 139 allow the MUX 150 to function in one of a SD and a SDIO compliant mode. Multiplexer access control may merely include switching control from one of the SD mode and SDIO mode control modules 137, 139 to the other.

Figure 4:
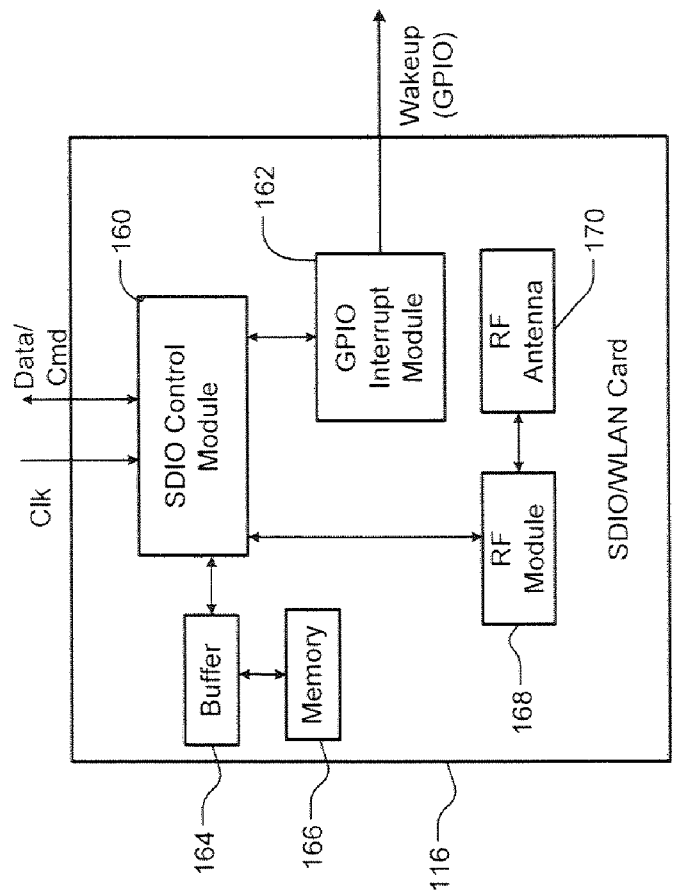
FIG. 4 is a functional block diagram of a SDIO WLAN card according to the present disclosure.

Referring now to FIG. 4, the SDIO WLAN card 116 may include a control module 160 that may send and receive data and command signals to the host 100. The control module 160 may communicate based on clock signals from the host 100. The control module 160 may control a GPIO interrupt module 162 that generates the interrupt signal and a notification signal that notifies the bus control module 132 of the interrupt signal when the control module 160 requires access to the bus 130. The GPIO interrupt module 162 may transmit the notification signal to the host 100 through a different port than the SD communications and the interrupt, such as the GPIO port 120. The GPIO interrupt module 162 may also notify the control module 160 that such a notification has been made.

The control module 160 may hold the interrupt (i.e. refrain from transmitting the interrupt) until the bus access is granted to the SDIO WLAN card 116 and/or the SDIO WLAN application module 106. The control module 160 may hold the interrupt so that the bus control module 132 does not immediately switch between modes to avoid collision of SDIO signals with SD signals. Such a collision may corrupt one or both of the signals.

The bus control module 132 may receive the notification signal and may then trigger SD exit from the bus 130 if the bus 130 is occupied/communicating in a SD format. The control module 160 may also implement functions needed for peripherals to comply with the SDIO standard and to connect to host device 100.

The control module 160 may store data in a buffer 164 that the SDIO application module 106 may read/write from and/or other storage memory 166 that may permanently store data after the read/write operations are completed. Such storage memory may include NAND flash, optical disk, laser-recordable disk, or magnetic surfaces of hard disks.

A radio frequency (RF) module 168 of the SDIO WLAN card 116 may control wireless communications via an RF antenna 170. The RE module 168 may be compatible with any of IEEE standards 802.11, 802.11a, 802.11b. 802.11g, 802.11h, 802.11n, 802.16, 802.20 and Bluetooth, which are incorporated herein in their entirety.

When the SDIO WLAN card 116 is inserted in the port 118, the host 100 may recognize card information and respond with a number of commands to identify and/or recognize the inserted SDIO WLAN card 116. The interface 112 interprets the commands and returns a response to the host 100 from the SDIO WLAN card 116. Data, for example, image data from a digital camera, image data from an IP phone, etc., can then be received and transmitted between the SDIO application module 106 and the SDIO WLAN card 116.

The bus 130 may control mutual access between SD and SDIO driver modules. When one driver module controls access, the other might not access until control is released by the first driver module. The bus control module may arbitrate control by controlling the MUX 150 in the bus 130. The bus control module 132 may arbitrate MUX control through one or more semaphores. Semaphores may therefore also be referred to herein as access control and/or multiplexer control.

The semaphore may be a protected variable (or abstract data type) that is used to restrict access to shared resources (for example, SD and SDIO driver modules). The bus control module 132 may allow the SD driver module 108 or the SDIO WLAN driver module 110 to acquire the semaphore. Once the semaphore is acquired by one driver module, the other driver module may not acquire the semaphore until the semaphore is released by the first driver module. The semaphore may be initialized to the number of equivalent shared resources it is implemented to control. The SD mode control module 137 controls the MUX 150 when the SD driver module 108 acquires the multiplexer control/semaphore, and the SDIO mode control module 139 controls the MUX 150 when the SD driver module 108 acquires the multiplexer control/semaphore.

For example, before the SD memory card 114 accesses the bus 130, the SD driver module 108 tries to acquire the semaphore. The SD driver module 108 may request the bus control module 132 to put the SDIO WLAN driver module 110 and/or SDIO WLAN card 116 into a special operating mode, such as a sleep mode. The SD driver module 108 may then acquire the semaphore from the bus control module 132. The SDIO WLAN driver module 110 is then not allowed to access the bus 130 until the SDIO WLAN driver module 110 is switched out of the special operating mode and into a normal operating mode.

The SD application module 104 may freely access the bus 130 as long as the SDIO WLAN driver module is in the special mode. However, if in the special mode, the SDIO WLAN card 116 needs to send data to the host 100, the card 116 may generate an event or notification of interrupt signal through the GPIO port 120 to first notify the host 100. The GPIO port 120 may be used because the port 118 may be occupied with SD communications whereby communications through the MUX 150 directly is not allowed. The bus control module 132 may attempt to exit SD access/processes after receiving the notification signal from the SDIO WLAN card 116. The bus control module 132 may grant bus access if SD access exits successfully. The SD driver module 108 may release the semaphore but request a callback function from the SDIO WLAN driver module 110. The callback function may be used to reacquire bus access, and may include, for example, granting bus access only for a limited time.

Figure 5:
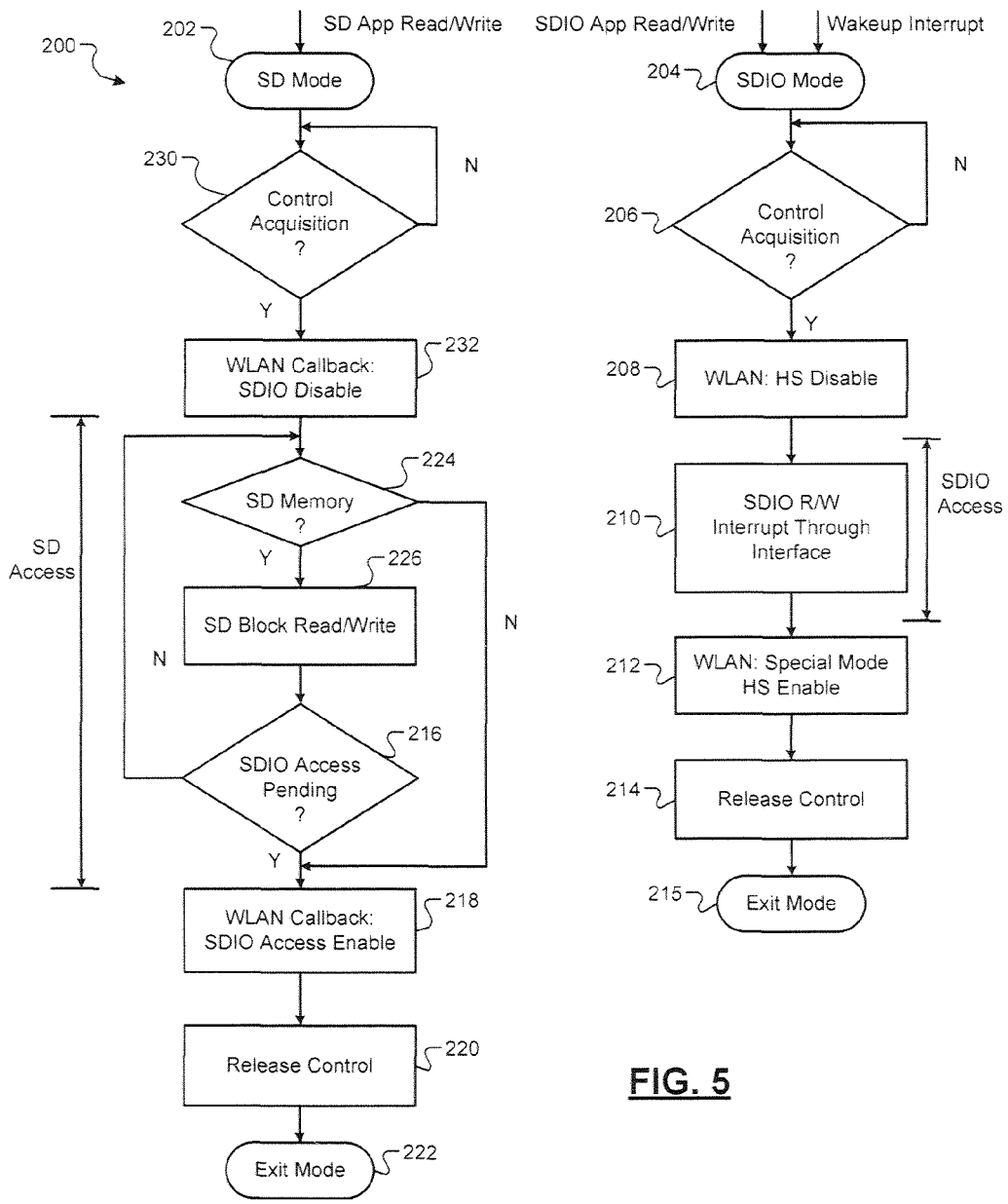
FIG. 5 is a block diagram that illustrates a method of controlling host side communications according to the present disclosure.

Referring now to FIG. 5, a block diagram 200 illustrates a method for controlling access of the SD and SDIO WLAN driver modules 108, 110 to respective cards via control of the MUX 150. Control starts in one of a SD mode 202 or a SDIO mode 204. The driver modules 108, 110 are responsive to SD and SDIO WLAN application modules 104, 106 respectively. A read or write operation of the SD application module 104 may trigger the SD mode 202. The SDIO mode 204 may be triggered by a transmission from the SDIO application module 106 and/or upon reception of the notification signal from the SDIO WLAN card 116.

In step 206 if the SDIO driver module 110 has acquired multiplexer control, the SD mode may be disabled in step 208. The SD mode may include a special/sleep mode. In step 210, the SDIO application 106 may read and/or write and/or operate functions of the SDIO/WLAN card 116. The bus control module 132 may enable the SD mode in step 212, release multiplexer control in step 214 when the SDIO application module 106 does not require bus access, and exit the SDIO mode in step 215.

If the SDIO application module 106 has not acquired multiplexer control in step 206 but SDIO access is pending in step 216, the bus control module 132 may callback/enable SDIO control of the bus 130 in step 218. The bus control module may then release multiplexer control for the SD application module 104 in step 220 and exit the SD mode in step 222.

If SDIO access is not pending in step 216, the SD application module 104 may use the bus 130 to access the SD memory card 114. If SD storage has been utilized and/or access thereto restricted in step 224, control returns to step 218. Otherwise, in step 226, the SD application module 104 reads/writes to the SD memory card 114.

Step 230 checks for acquisition of multiplexer control by the SD application module 104 if the bus 130 is initially in or defaulted to the SD mode in step 202. When the bus control module 132 grants access to the SD application module 104, the control module 132 may also restrict/disable WLAN application module access to the bus 130.

Figure 6:
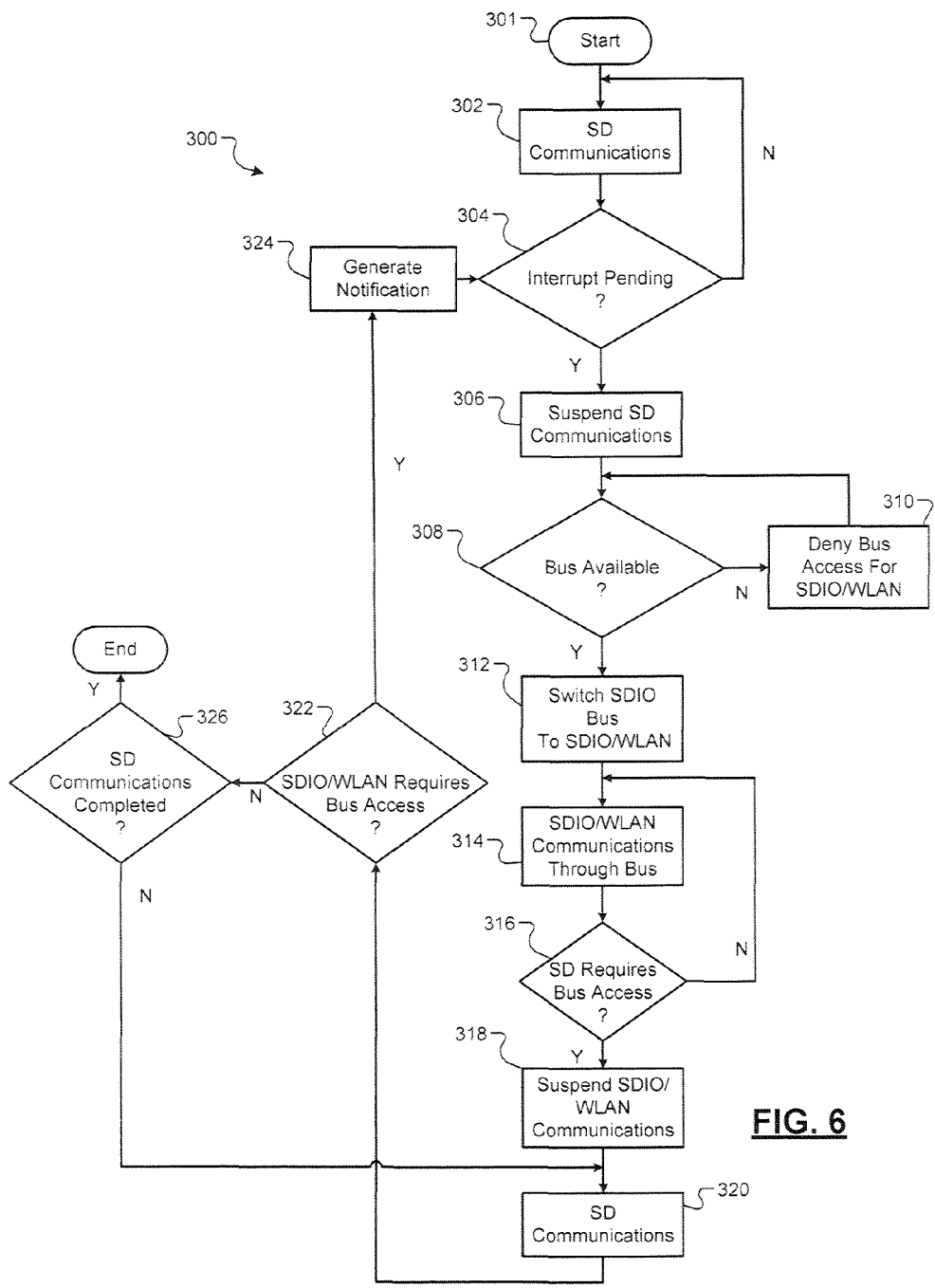
FIG. 6 is a functional block diagram that illustrates a method of controlling SDIO/SD card side communications according to the present disclosure.

Referring now to FIG. 6, a block diagram 300 illustrates a method whereby the SDIO WLAN card 116 holds an interrupt until the SDIO WLAN application module 106 is granted bus control/access. Control starts in step 301. In step 302, if there are SD communications, the communications proceed. In step 304, if the SDIO WLAN card 116 has generated a notification signal when an interrupt from the SDIO WLAN card 116 is pending, SD communications are suspended in step 306. In step 308, if the bus 130 is not available because, for example, SD communications have not terminated, the bus control module 132 may deny access to the SDIO WLAN card 116 in step 310.

Otherwise, in step 312, the bus control module 132 may switch the bus 130 from a SD communication module to a SDIO WLAN communication mode. The SDIO WLAN card 116 may then communicate with the SDIO WLAN application module 106 through the bus 130 in step 314. In step 316, if the SD memory card 114 requires bus access, the bus control module 132 may suspend SDIO WLAN communications in step 318. In step 320, the SD memory card 114 may communicate with the SD application module 104.

In step 322 if the SDIO WLAN card 116 again requires bus access, the SDIO WLAN card 116 may generate an interrupt and a notification signal for the interrupt in step 324. Control may then return to step 304. Otherwise, if SD communications are completed in step 326, control ends.

Referring now to FIGS. 7A-7F, various exemplary implementations incorporating the teachings of the present disclosure are shown.

Figure 7A:
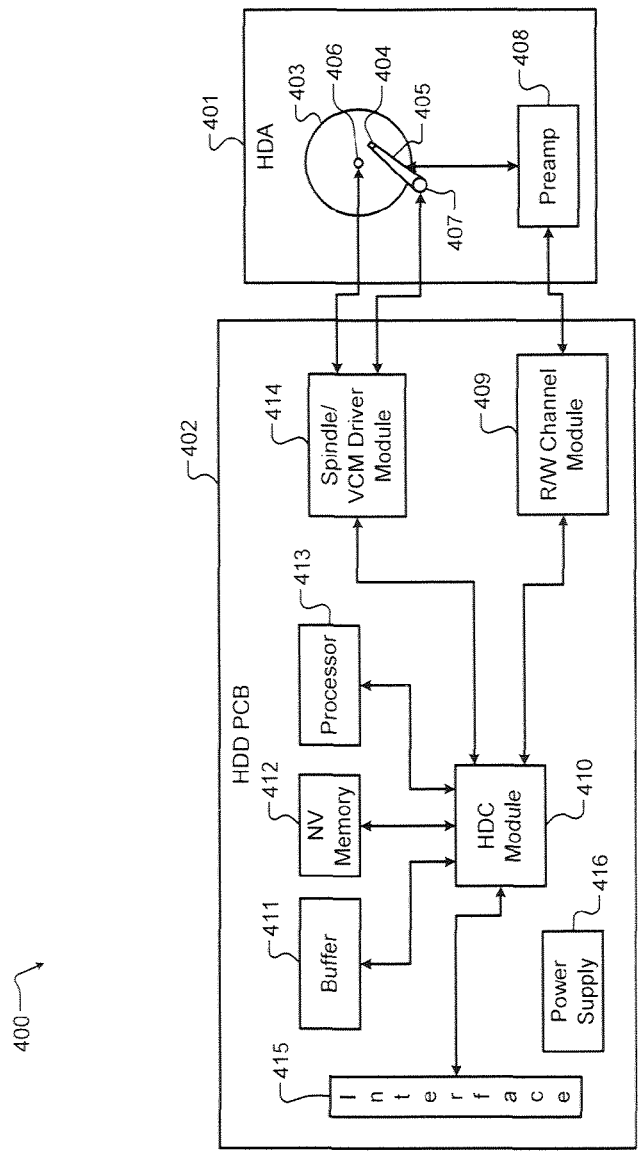
FIG. 7A is a functional block diagram of a hard disk drive.

Referring now to FIG. 7A, the teachings of the disclosure can be implemented in an I/O interface module of a hard disk drive (HDD) 400, wherein SD and SDIO cards communicate with the interface. The HDD 400 includes a hard disk assembly (HDA) 401 and an HDD printed circuit board (PCB) 402. The HDA 401 may include a magnetic medium 403, such as one or more platters that store data, and a read/write device 404. The read/write device 404 may be arranged on an actuator arm 405 and may read and write data on the magnetic medium 403. Additionally, the HDA 401 includes a spindle motor 406 that rotates the magnetic medium 403 and a voice-coil motor (VCM) 407 that actuates the actuator arm 405. A preamplifier device 408 amplifies signals generated by the read/write device 404 during read operations and provides signals to the read/write device 404 during write operations.

The HDD PCB 402 includes a read/write channel module (hereinafter, "read channel") 409, a hard disk control module (HDC) module 410, a buffer 411, nonvolatile memory 412, a processor 413, and a spindle/VCM driver module 414. The read channel 409 processes data received from and transmitted to the preamplifier device 408. The HDC module 410 controls components of the HDA 401 and communicates with an external device (not shown) via the I/O interface module 415. The external device may include a computer, a multimedia device, a mobile computing device. SD and SDIO cards, etc. The I/O interface module 415 may include wireline and/or wireless communication links.

The HDC module 410 may receive data from the HDA 401, the read channel 409, the buffer 411, nonvolatile memory 412, the processor 413, the spindle/VCM driver module 414, and/or the I/O interface module 415. The processor 413 may process the data, including encoding, decoding, filtering, and/or formatting. The processed data may be output to the HDA 401, the read channel 409, the buffer 411, nonvolatile memory 412, the processor 413, the spindle/VCM driver module 414, and/or the I/O interface module 415.

The HDC module 410 may use the buffer 411 and/or nonvolatile memory 412 to store data related to the control and operation of the HDD 400. The buffer 411 may include DRAM, SDRAM, etc. The nonvolatile memory 412 may include flash memory (including NAND and NOR flash memory), phase change memory, magnetic RAM, or multi-state memory, in which each memory cell has more than two states. The spindle/VCM driver module 414 controls the spindle motor 406 and the VCM 407. The HDD PCB 402 includes a power supply 416 that provides power to the components of the HDD 400.

Figure 7B:
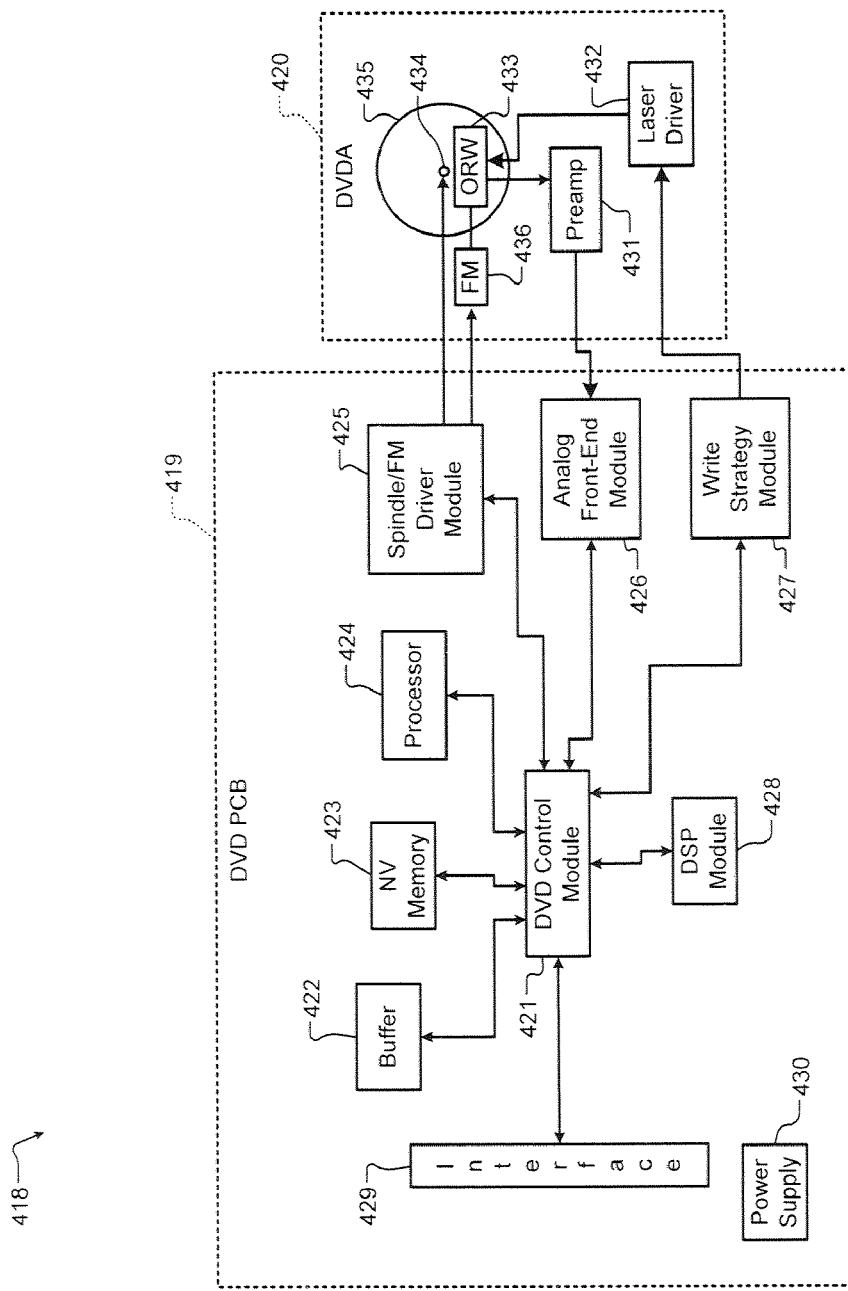
FIG. 7B is a functional block diagram of a DVD drive.

Referring now to FIG. 7B, the teachings of the disclosure can be implemented in an I/O interface module of a DVD drive 418 or of a CD drive (not shown). The SD and SDIO cards may communicate with the I/O interface module. The DVD drive 418 includes a DVD PCB 419 and a DVD assembly (DVDA) 420. The DVD PCB 419 includes a DVD control module 421, a buffer 422, nonvolatile memory 423, a processor 424, a spindle/FM (feed motor) driver module 425, an analog front-end module 426, a write strategy module 427, and a DSP module 428.

The DVD control module 421 controls components of the DVDA 420 and communicates with an external device (not shown) via the I/O interface module 429. The external device may include a computer, a multimedia device, a mobile computing device. SD and SDIO cards, etc. The I/O interface module 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface module 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface module 429.

The DVD control module 421 may use the buffer 422 and/or nonvolatile memory 423 to store data related to the control and operation of the DVD drive 418. The buffer 422 may include DRAM, SDRAM, etc. The nonvolatile memory 423 may include flash memory (including NAND and NOR flash memory), phase change memory, magnetic RAM, or multi-state memory, in which each memory cell has more than two states. The DVD PCB 419 includes a power supply 430 that provides power to the components of the DVD drive 418.

The DVDA 420 may include a preamplifier device 431, a laser driver module 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver module provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing data to the laser driver module 432. The laser driver module 432 controls the optical device 433 to write data to the optical storage medium 435.

Figure 7D:
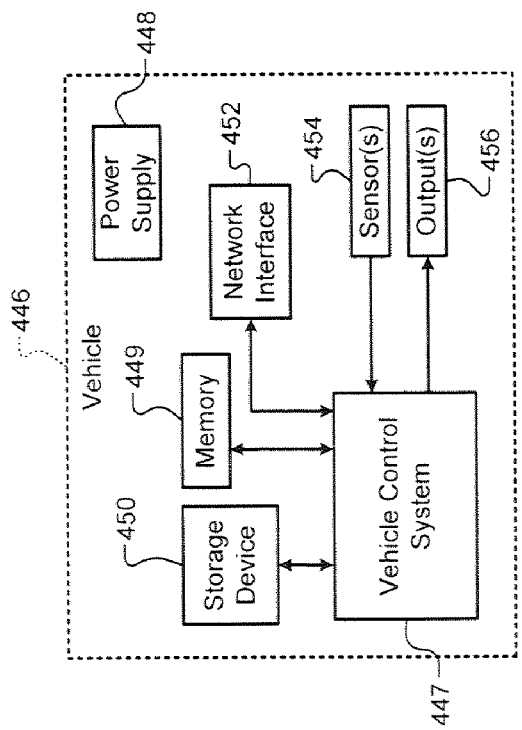
FIG. 7D is a functional block diagram of a vehicle control system.
Figure 7C:
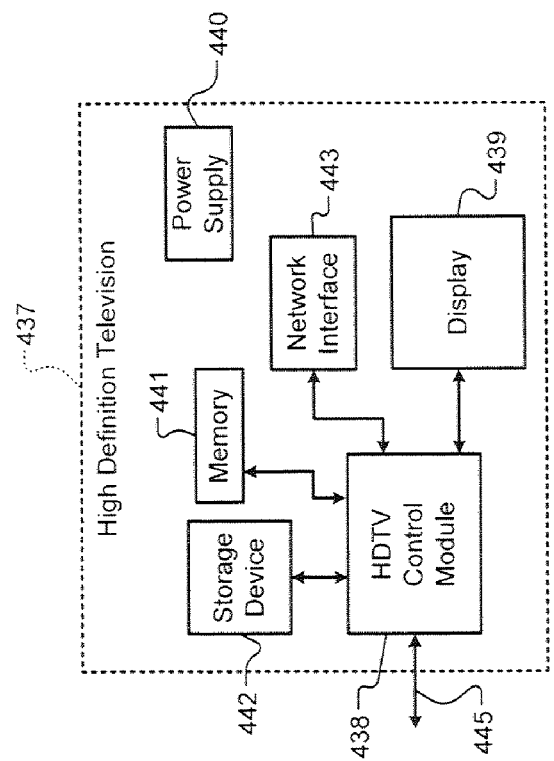
FIG. 7C is a functional block diagram of a high definition television.

Referring now to FIG. 7C, the teachings of the disclosure can be implemented in a control module of a high definition television (HDTV) 437. The SD and SDIO cards may communicate with the HDTV control module, and the control module may include the previously discussed interface architecture. The HDTV 437 includes the HDTV control module 438, a display 439, a power supply 440, memory 441, a storage device 442, a network interface module 443, and an external interface module 445. If the network interface module 443 includes a wireless local area network interface module, an antenna (not shown) may be included.

The HDTV 437 can receive input signals from the network interface module 443 and/or the external interface module 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface module 443, and the external interface module 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the network interface module 443 and/or the external interface module 445. The power supply 440 provides power to the components of the HDTV 437.

Referring now to FIG. 7D, the teachings of the disclosure may be implemented in a control system of a vehicle 446 that communicates with SD and SDIO cards. The vehicle 446 may include the vehicle control system 447, a power supply 448, memory 449, a storage device 450, and a network interface module 452. If the network interface module 452 includes a wireless local area network interface module, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the network interface module 452.

Figure 7F:
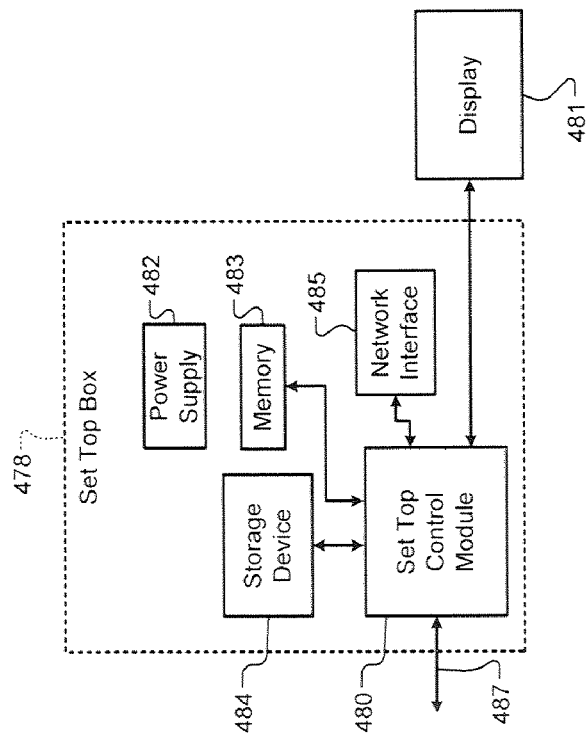
FIG. 7F is a functional block diagram of a set top box.
Figure 7E:
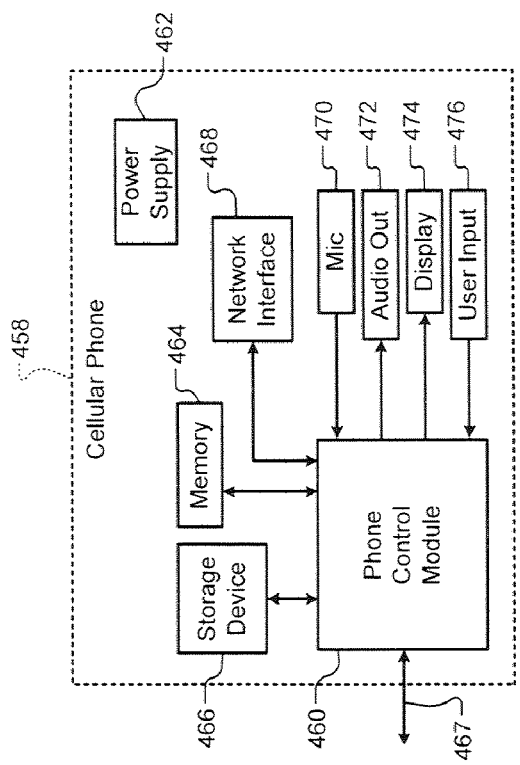
FIG. 7E is a functional block diagram of a cellular phone.

Referring now to FIG. 7E, the teachings of the disclosure can be implemented in a control module of a cellular phone 458 that communicates with SD and SDIO cards. The cellular phone 458 includes the phone control module 460, a power supply 462, memory 464, a storage device 466, and a cellular network interface module 467. The cellular phone 458 may include a network interface module 468, a microphone 470, an audio output 472 such as a speaker and/or output jack, a display 474, and a user input device 476 such as a keypad and/or pointing device. If the network interface module 468 includes a wireless local area network interface module, an antenna (not shown) may be included.

The phone control module 460 may receive input signals from the cellular network interface module 467, the network interface module 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface module 467, the network interface module 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 7F, the teachings of the disclosure can be implemented in a control module of a set top box 478. The set top box 478 includes the set top control module 480, a display 481, a power supply 482, memory 483, a storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 484 may include an optical storage drive, such as a DVD drive, and/or a hard disk drive (HDD).

Figure 7G:
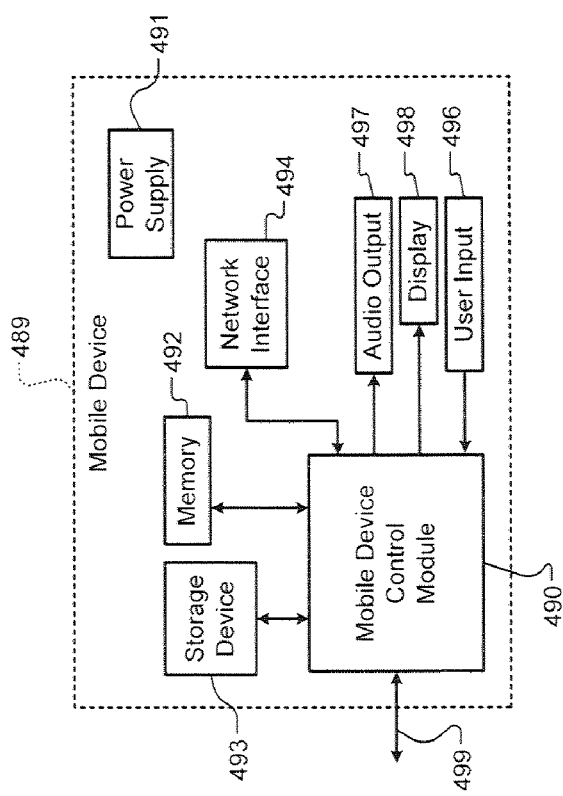
FIG. 7G is a functional block diagram of a mobile device.

Referring now to FIG. 7G, the teachings of the disclosure can be implemented in a control module of a mobile device 489 that communicates with SD and SDIO cards. The mobile device 489 may include the mobile device control module 490, a power supply 491, memory 492, a storage device 493, a network interface module 494, and an external interface module 499. If the network interface module 494 includes a wireless local area network interface module, an antenna (not shown) may be included.

The mobile device control module 490 may receive input signals from the network interface module 494 and/or the external interface module 499. The external interface module 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface module, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An interface system, comprising:
a secure digital input/output (SDIO) card; and
a host including
    an SDIO driver module;
    a secure digital (SD) driver module;
    a multiplexer configured to allow communication between (i) the SDIO card and the SDIO driver module while the multiplexer operates in an SDIO mode, and (ii) an SD card and the SD driver module while the multiplexer operates in an SD mode;
    an input/output port independent of the multiplexer; and
    a bus control module configured to (i) set the multiplexer to the SDIO mode in response to the SDIO driver module acquiring a semaphore, (ii) set the multiplexer to the SD mode in response to the SD driver module acquiring the semaphore, and (iii) in response to receiving a notification signal from the SDIO card via the input/output port, request that the SD driver module release the semaphore, wherein the SD driver module attempts to acquire the semaphore in response to a request for access to the SD card, and wherein the SDIO card is configured to (i) selectively generate an interrupt, (ii) store the interrupt, (iii) in response to generation of the interrupt, transmit the notification signal to the bus control module via the input/output port independently of the multiplexer, and (iv) in response to the SDIO driver module acquiring the semaphore, deliver the stored interrupt to the SDIO driver module via the multiplexer.

2. The interface system of claim 1, wherein:

the SD driver module is configured to, in response to detecting an SDIO access pending, (i) release the semaphore and (ii) transmit a callback request to the bus control module; and the bus control module is configured to, in response to the callback request, (i) set the multiplexer to the SDIO mode and (ii) after spending a predetermined amount of time in the SDIO mode, set the multiplexer back to the SD mode.

3. The interface system of claim 2, wherein the bus control module is configured to, prior to setting the multiplexer to the SDIO mode, set the predetermined amount of time based on information in the callback request.

4. The interface system of claim 1, wherein the SD card is a flash memory card, and wherein the SDIO card is a wireless local area network (WLAN) card.

5. The interface system of claim 1, wherein the host includes a bus that includes the multiplexer and the bus control module.

6. The interface system of claim 1, wherein the bus control module (i) prevents the SD driver module from acquiring the semaphore until the SDIO driver module releases the semaphore and (ii) prevents the SDIO driver module from acquiring the semaphore until the SD driver module releases the semaphore.

7. The interface system of claim 1, further comprising the SDIO driver module, wherein the SDIO driver module attempts to acquire the semaphore in response to (i) the notification signal and (ii) a request for access to the SDIO card.

8. The interface system of claim 7, wherein the SDIO driver module is configured to enter a special operating mode prior to releasing the semaphore.

9. The interface system of claim 8, wherein the special operating mode is a sleep mode.

10. The interface system of claim 8, wherein the SDIO driver module is configured to exit the special operating mode prior to communicating with the SDIO card via the multiplexer.

11. A method comprising:

while a secure digital input/output (SDIO) mode is selected, allowing communication between an SDIO driver module of a host and an SDIO card via a multiplexer;

while a secure digital (SD) mode is selected, allowing communication between an SD driver module of the host and an SD card via the multiplexer;

selecting the SDIO mode in response to the SDIO driver module acquiring a semaphore;

selecting the SD mode in response to the SD driver module acquiring the semaphore;

in response to a request for access to the SD card, attempting to acquire the semaphore for the SD driver module;

generating an interrupt in the SDIO card;

storing the interrupt in the SDIO card;

in response to generation of the interrupt, transmitting a notification signal from the SDIO card to the host via an input/output port that is independent of the multiplexer;

in response to receiving the notification signal from the SDIO card via the input/output port, requesting that the SD driver module release the semaphore; and in response to the SDIO driver module acquiring the semaphore, transmitting the stored interrupt from the SDIO card to the SDIO driver module via the multiplexer.

12. The method of claim 11, further comprising:

in response to detecting an SDIO access pending, (i) releasing the semaphore from the SD driver module and (ii) generating a callback request; and in response to the callback request, (i) selecting the SDIO mode and (ii) after spending a predetermined amount of time in the SDIO mode, selecting the SD mode.

13. The method of claim 12, further comprising, prior to entering the SDIO mode, setting the predetermined amount of time based on information in the callback request.

14. The method of claim 11, further comprising:

preventing the SD driver module from acquiring the semaphore until the SDIO driver module releases the semaphore; and preventing the SDIO driver module from acquiring the semaphore until the SD driver module releases the semaphore.

15. The method of claim 11, further comprising attempting to acquire the semaphore by the SDIO driver module in response to (i) the notification signal and (ii) a request for access to the SDIO card.

16. The method of claim 15, further comprising initiating a special operating mode of the SDIO driver module prior to releasing the semaphore.

17. The method of claim 16, wherein the special operating mode is a sleep mode.

18. The method of claim 16, further comprising exiting the special operating mode of the SDIO driver module prior to communicating between the SDIO driver module and the SDIO card via the multiplexer.

* * * * *